United States Patent [19]
Nebesar et al.

[11] 3,799,711
[45] Mar. 26, 1974

[54] SIDE HOUSING FOR ROTARY PISTON ENGINE AND METHOD OF HARDENING A SURFACE OF THE SAME

[75] Inventors: George C. Nebesar, Parma; Robert V. Vickers, Shaker Heights, both of Ohio

[73] Assignee: General Motors Corporation, Detroit, Mich.

[22] Filed: July 20, 1972

[21] Appl. No.: 273,523

[52] U.S. Cl. .............................................. 418/178
[51] Int. Cl. .......................................... F01c 21/00
[58] Field of Search ..................... 418/178, 60, 61

[56] References Cited
UNITED STATES PATENTS
3,575,537  4/1971  Yamamoto .................... 418/178

Primary Examiner—C. J. Husar
Attorney, Agent, or Firm—Meyer, Tilberry & Body

[57] ABSTRACT

A side housing for a rotary piston internal combustion engine having an inwardly facing surface in rubbing contact with seals on the rotor of the engine, the surface having separate and distinct hardened zones arranged in a generally uniform pattern with the zones having converging portions to provide tortuous, non-hardened areas in the surface and the method of hardening these zones.

1 Claim, 5 Drawing Figures 3,799,711

SIDE HOUSING FOR ROTARY PISTON ENGINE AND METHOD OF HARDENING A SURFACE OF THE SAME

The invention relates to the art of rotary piston internal combustion engines and more particularly to the side housing of such an engine and the method of hardening a surface of the same.

Recently there has been considerable activity in the art of developing a commercially acceptable rotary piston engine generally known as a Wankel engine. In developing a production engine of this type, several engineering problems have been encountered. Considerable effort has been devoted to solving these problems, one of which relates to the inwardly facing surfaces of the end, or side, housings located on each side of the rotary piston chamber. These surfaces are in rubbing contact with certain seals of the rotary piston; therefore, unwanted wear occurs at these inwardly facing surfaces. Substantial engineering efforts have been devoted to methods and procedures for hardening these surfaces of the side housings.

Hardening the inwardly facing, seal engaging surface of the end housing has produced unique difficulties. The surface is a part of a relatively thin metal wall which is susceptible to severe warping during any normal hardening operation. Warping would require subsequent grinding which is not desirable in the production of the side housings.

One attempt to solve this problem of hardening the inwardly facing surface of a side housing for a Wankel engine is found in U. S. Pat. No. 3,575,537 wherein a series of radially extending hardened zones are provided on the surface between a locus created by the outermost seal on the rotary piston and a locus created by the outermost extremity of an inner seal on the rotary piston. This type of heating pattern for the inner surface of the side housing of a Wankel engine presents serious difficulties in the hardening operation. The radially extending striped hardened zones converge as they progress inwardly from the outer periphery of the surface. This necessarily places the inner ends of the zones quite close together and creates undue stress at this particular location on the surface. In addition, since the zones are heated and quenched successively, there is a possibility of drawing or annealing the inner end of a previously hardened zone when the next adjacent zone is being inductively heated for subsequent quench hardening. This is especially true if the quenching operation is not performed immediately after heating and with a large volume of liquid to prevent conduction from the newly heated zone to the previously hardened zone.

Since it is somewhat difficult to increase the width of the zones as they extend radially outwardly, the striped pattern as shown in this previous patent results in relatively large spacing between adjacent hardened zones toward the outer periphery of the inner surface. This substantially reduces the total amount of the surface actually hardened for improving the wear characteristics thereof. By using the striped pattern, as clearly mentioned in the previous patent, it is undesirable to extend the hardened pattern inwardly to protect the innermost portion of the surface from wear.

As wear does occur on the surface, valleys are created between the striped hardened zones; therefore, as the seals slide over the surface there are presented certain well defined passages through which gas can blow by the seals which will result in excessive oil consumption.

All of these disadvantages of the striped heating pattern illustrated in prior U.S. Pat. No. 3,575,537 have been overcome by the present invention which relates to a unique hardness pattern or arrangement to be used on the inner surfaces of the side housing of a Wankel engine.

In accordance with the present invention, there is provided an improvement in a side housing for a Wankel engine having a plurality of separate and distinct hardened zones on the inner surface thereof, which improvement comprises forming the hardened zones in a somewhat circular or arcuate pattern around the inner surface of the housing. This pattern extends between an outer extremity and an inner extremity of the housing and each of the hardened zones has first and second portions spaced from each other in a direction generally circumferential of the pattern with the first and second portions of each hardened zone converging in a generally radial direction. These zones are uniformly distributed around the pattern in a generally reoccurring matrix.

The phrase generally "somewhat circular" in the above definition of the invention means a shape around the periphery of the side housing which shape has been called trochoidal and is generally two spaced, mutually facing convex arcs joined together at the two ends thereof by two gradual concaved arcs. This is the normal shape for a Wankel engine.

In accordance with a more limited aspect of the present invention, each of the zones has a generally arcuate shape with two spaced legs forming the first and second portions thereof. These zones are arranged in two somewhat circular, concentric subpatterns with the zones of the inner subpattern having legs extending radially outwardly. The zones in the outer pattern each have legs extending radially inwardly. These legs overlap to provide a uniform distribution of heating zones around the two subpatterns.

In accordance with another limited aspect of the present invention, the hardened zones, as described above, are generally V-shaped and have two spaced legs which form the first and second portions. They can be arranged in subpatterns as explained above.

In accordance with still a further limited aspect of the present invention, the zones have a generally circular shape with the first portion being one side of the circular shape and the second portion being the opposite side of the circular shape. These circular shaped hardened zones are uniformly distributed around the area to be hardened.

In accordance with another aspect of the invention, there is provided a method of hardening a generally arcuate area of the inwardly facing surface in the side housing of a Wankel engine when the arcuate area includes an outer arcuate subarea and an inner arcuate subarea. This method comprises the steps of providing a first inductor formed into a shape having two spaced legs and a connecting portion for the legs, providing a second inductor formed into a shape having two spaced legs and a connecting portion for the legs, positioning the first inductor closely adjacent the surface of the side housing in the outer subarea with the legs of the inductor extending in a radially inwardly direction, positioning the second inductor closely adjacent the surface of the side housing in the inner subarea with the legs extending in a radially outwardly direction, energizing the inductors with a high frequency power source to heat a zone in each of the subareas to form heated zones matching the shape of the inductors, quenching these heated zones, indexing the housing in a direction generally corresponding to the plane of the surface to bring the first inductor into a new location on the outer subarea and the second inductor into a new location on the inner subarea, which new locations are unhardened, and repeating the energizing and quenching steps. In this manner, successive hardened zones in the two subareas can be simultaneously heated to produce a series of such hardened zones in at least an arcuate portion of the inner surface.

By hardening the inner surface in accordance with the invention as defined above, the hardened zones do not converge in a radially inwardly direction. Consequently, the hardened zones can be employed closer to the center of the surface than was heretofore possible without causing undue strain or annealing of previously hardened zones. In addition, there is no straight line unhardened areas which can cause uniform locations for oil blow by. The invention provides a relatively complete pattern of hardening over the inner surface without allowing valleys to be created in straight radial directions on the surface. All of these features combine to create an improved hardness pattern for use on the side housing of a rotary piston internal combustion engine.

The primary object of the present invention is the provision of a side housing for a rotary piston internal combustion engine having a hardened inner surface, which surface includes hardened zones that do not cause excessive warping during hardening.

Another object of the present invention is the provision of a side housing for a rotary piston internal combustion engine having a hardened inner surface, which surface includes separate, individual hardened zones that can be provided inwardly over an increased portion of the surface.

Another object of the present invention is the provision of a side housing as defined above wherein the zones form tortuous unhardened areas.

Still another object of the present invention is a side housing as defined above wherein the hardened zones assist in reducing oil blow by.

Still a further object of the present invention is the provision of a side housing as defined above wherein the hardened zones reduced limited areas of oil blow by through the pattern of hardened zones.

Still a further object of the present invention is the provision of a method of creating the separate, individual hardened zones resulting in the advantages described above.

These and other objects and advantages will become apparent from the following description taken together with the accompanying drawings in which.

Figure 1:
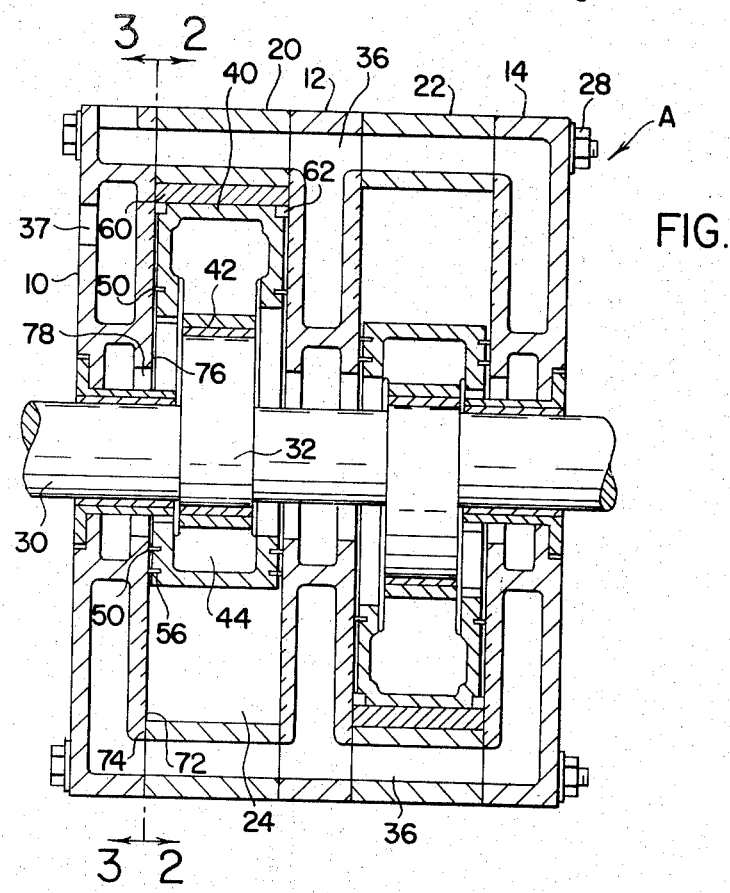
FIG. 1 is a schematic side, cross-sectional view of a somewhat standard rotary piston internal combustion engine.
Figure 2:
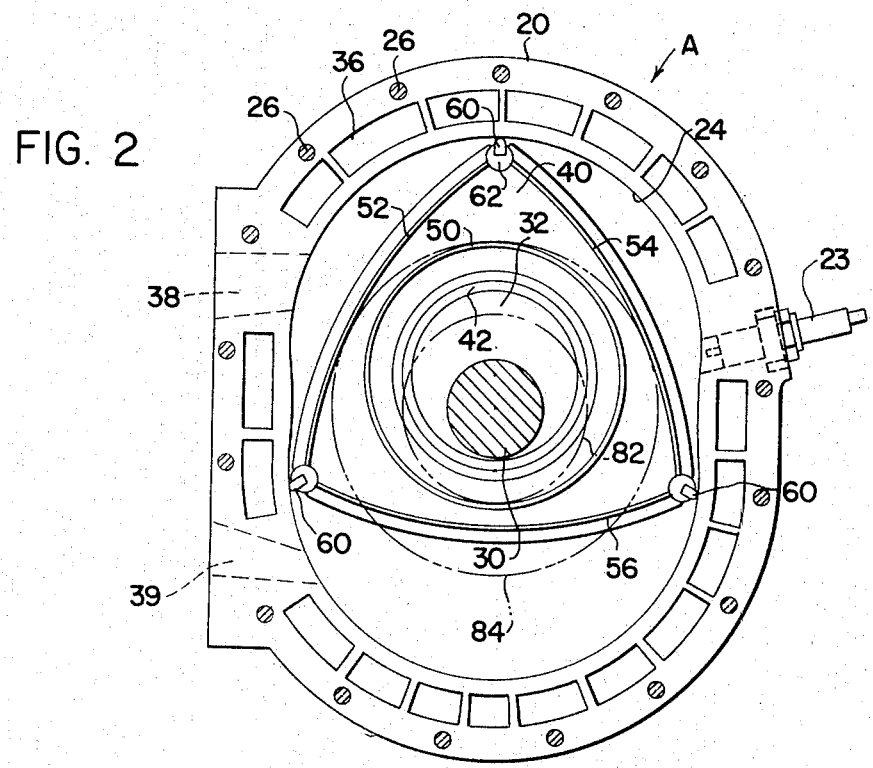
FIG. 2 is a cross-sectional view taken generally along line 2—2 of FIG. 1.
Figure 3:
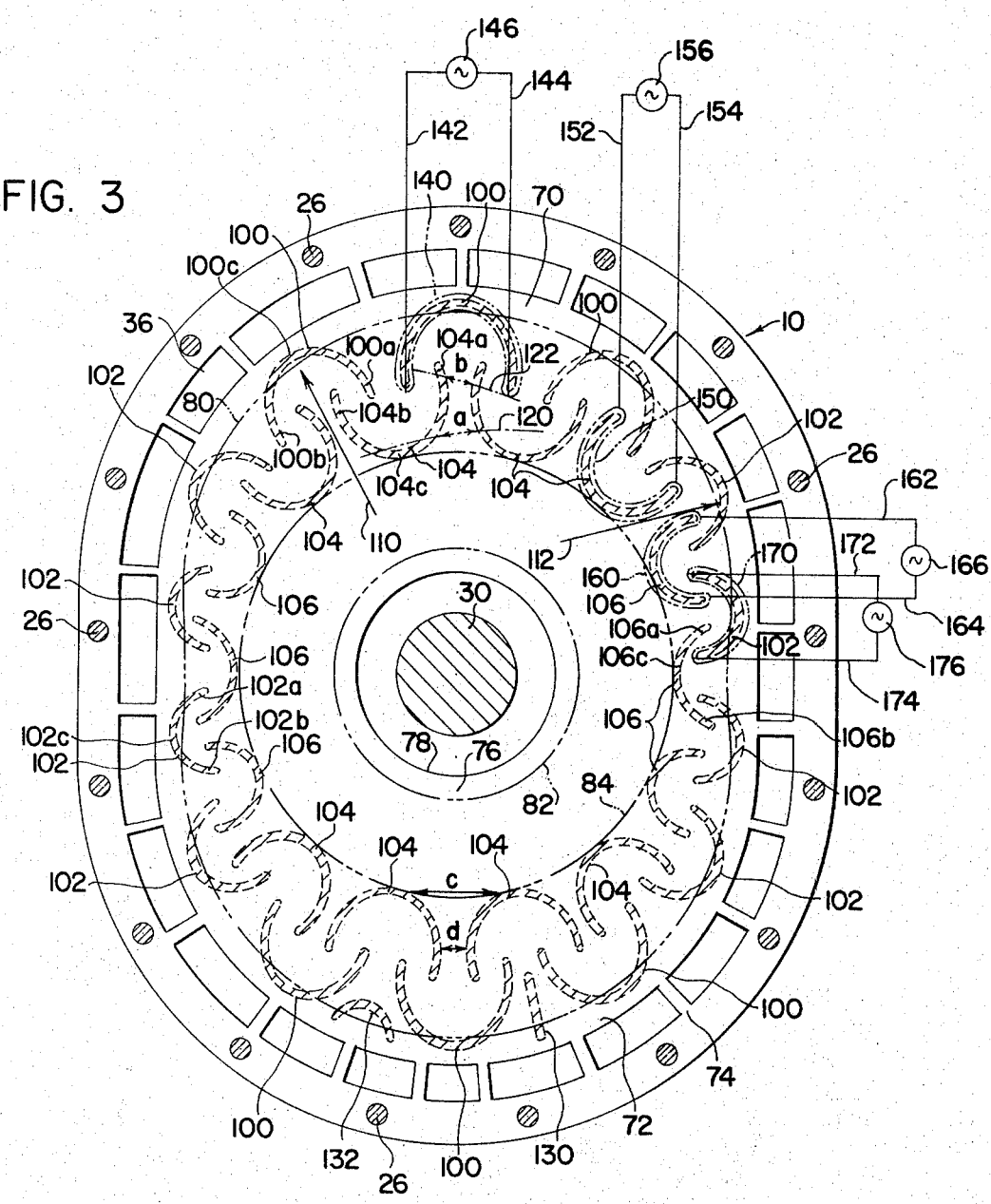
FIG. 3 is an enlarged cross-sectional view taken generally along line 3—3 of FIG. 1 and showing the preferred embodiment of the present invention with certain induction heating apparatus superimposed in phantom lines thereon.

Referring now to the drawings wherein the showings are for the purpose of illustrating preferred embodiments of the invention only but not for the purpose of limiting same, FIGS. 1–3 schematically illustrate a somewhat standard rotary piston internal combustion engine A, generally known as a Wankel engine, which includes three side housings 10, 12, and 14 separated by cylinders 20, 22. Although two cylinders and three side housings are illustrated, only cylinder 20 will be described in detail together with side housing 10. This description will apply equally to the other side housings and cylinder. As shown in FIG. 2, a spark plug 23 is employed for the purpose of igniting a combustible mixture within the cylinder 30 which has an inner chamber 24 with a generally trochoidal shape. This trochoidal shape is generally two spaced convex arcs joined at their mutually facing ends by two concave arcs. This is a general configuration of a Wankel engine and forms no particular part of the present invention, although the invention is for use in this type of engine. A plurality of peripherally spaced holes 26 receive bolts 28 for securing the side housings and cylinders together as a unit, as best shown in FIG. 1.

Centrally located, and extending through the engine, is a driven shaft 30 having an eccentric 32 located within chamber 24. Cooling passages 36 extend through and around the housings and cylinders for receiving an oil or other coolant through coolant inlet 37. The engine is provided with an intake passage 38 and an exhaust passage 39, as is standard practice in this type of engine. A somewhat triangular shaped piston 40 is secured onto eccentric 32 by coupling 42 and contains an internal coolant chamber 44 for cooling the piston as it is operating. In accordance with normal practice, the piston 40 includes an inner oil seal 50 on each side of the piston and bearing against the inwardly facing surfaces of the side housings 10, 12. Since the seals on both sides of the piston are identical, the seals on only the left hand side in FIG. 1 will be described in detail. In addition to the inner oil seal 50 there is provided three generally arcuately shaped side seals 52, 54, 56 which match the contour of the piston and are best shown in FIG. 2. At each apex of the piston 50 there is provided an apex seal 60 which presses radially outwardly against the inner surface of cylinder 20, as best shown in FIG. 1. A corner seal 62 is positioned at each seal 60 and with the side seals 52, 54 and 56 to provide a continuous sealing engagement with the inwardly facing surfaces 70 of the side housings 10, 12. This inwardly facing surface includes an outer periphery 72 generally adjacent mounting area 74 between the side housing and cylinder and an inner periphery 76 adjacent the central shaft opening 78.

As best shown in FIGS. 2 and 3, a locus 80 extends generally around the outer periphery 72 and is defined by the line transcribed by corner seals 62. In a like manner, a locus 82 is the innermost path of seal 50 as it rotates, and locus 84 is the outermost path of seal 50 as it rotates.

As so far described, the rotary piston engine A is substantially the same as the standard engine of this type, and in accordance with the disclosure of U. S. Pat. No. 3,575,537, the surface 70 is hardened by a series of radially extending striped hardened zones confined within the area between periphery 72 and locus 84. The present invention relates to a completely different concept in hardening this surface which concept may be used for hardening the surface inwardly of the locus 84 if this is desired.

Referring now to FIG. 3, a hardness pattern in accordance with the present invention is illustrated. In accordance with this illustration, the hardness pattern is between locus 80 and locus 84 and is divided into an outer subpattern, or subarea, and an inner subpattern, or subarea. Hardened zones 100, 102 extend around the locus 80 and are located within the outer subarea and form the outer subpattern. Hardened zones 100 are larger than hardened zones 102 because of the reduced width between locus 80 and locus 84 adjacent the sides of the cylinder 20. In a like manner, hardened zones 104, 106 are located in the inner subarea and form the inner subpattern of the total hardened pattern for the surface 70. The two subareas make up the total area affected by the hardened zones and the two subpatterns make up the total pattern. In accordance with the preferred embodiment of the present invention, the zones are each arcuately shaped and have two spaced legs. Zones 100 have legs 100a, 100b which are spaced apart in a generally circumferential direction and are joined by connecting portions 100c. In a like manner, zones 102 have legs 102a, 102b and connecting portions 102c. These zones in the outer subpattern have their legs extending radially inwardly. Referring now to the inner subpattern, zones 104 have legs 104a, 104b and connecting portions 104c. Zones 106 have spaced legs 106a, 106b and connecting portions 106c. The legs in zones 104, 106 which form the innermost subpattern extend radially outwardly. As clearly shown in FIG. 3, the adjacent legs of adjacent zones in each subarea or subpattern extend into the area between the legs of a single zone in the other subarea or subpattern. This provides an overlapping of the two subpatterns and allows a more fully hardened surface 70. Of course, various modifications may be made in the embodiment shown in FIG. 3. For instance, each of the zones may have the same size. This would force some zones adjacent the sides of cylinder 20 to extend inwardly beyond locus 84. Indeed, all of the hardened zones could be enlarged to extend into this central portion beyond locus 84 to more completely harden the total area of surface 70. The hardened zone can have various sizes. Without departing from the intended spirit and scope of the invention, third or third and fourth subpatterns could be provided inwardly of the illustrated pattern to harden the area between locus 82 and locus 84, instead of enlarging the size of the zones in the two illustrated subareas for hardening inwardly of locus 84.

It is quite obvious that the concept shown in FIG. 3 provides a uniform hardening of a large portion of the area within the hardened pattern; however, there are other advantages to the adoption of this particular type of heating pattern for the surface 70. It is noted that any straight line extending from locus 84 to locus 80, such as straight lines 110, 112, must extend through one of the hardened zones. This precludes a direct channel being developed across the total hardened pattern during wear of surface 70. This feature reduces blow by of oil around seals 52, 54 and 56 during the continued operation of engine A because a single channel can not be developed which will provide a continuous blow by passage for the total movement of one of the seals 52, 54 and 56 in any area of surface 70. Another aspect of this advantage of the present invention is illustrated by the use of lines 120, 122 which are the lines defined by one of the seals 52, 54 and 56 as the piston 40 moves around the chamber 24. It is noted that the spacing between adjacent zones 104, gradually reduces as one of the side seals passes from line 120 to line 122. This alters the size of a possible blow by area and causes a shifting of the blow by propensity to the other side of the respective adjacent zones 104 during progressive movement of piston 40. This continuous changing of sides and shifting of the possible blow by channels requires more general wear of the unhardened portions on surface 70 before continuous blow by can occur. The pattern causes a more even wear of surface 70 and precludes development of well defined blow by channels between the hardened zones. The unhardened zone which can wear first to allow all blow by are tortuous and continue to change possible blow by channels during movement of the piston.

Another advantage of the present invention is best shown by the distances c and d in the lower portion of FIG. 3. Distance c is greater than distance d and is inward of distance d. Consequently, there is no converging of the hardened zones in a direction inward of the surface 70 and especially in the relatively confined area adjacent the innermost portion thereof. Consequently, there is less tendency to develop an unwanted strain adjacent the relatively small inner portion of the hardened pattern. In some cases, it may be desirable to employ auxiliary hardened zones in various open spaces at the outside portions of the pattern illustrated in FIG. 3; therefore, two auxiliary hardened zones 130, 132 are illustrated. These zones do not distract from the operation of the pattern previously described.

A variety of methods could be employed for producing the various hardened zones as shown in FIG. 3. In accordance with the preferred embodiment, the larger hardened zones 100, 104 are produced by successively heating and quenching areas corresponding to these zones. A first inductor 140, shown in phantom lines, is connected by leads 142, 144 with a source of high frequency alternating current 146. This inductor has a shape generally corresponding to the shape of zones 100, and is positioned directly above the surface 70 and spaced therefrom in a manner well known in the induction heating art. Likewise, a second inductor 150, shown in phantom lines and corresponding to zone 104, is connected by leads 152, 154 across a high frequency alternating power source 156. By energizing the power sources 146, 156 the area below the inductors 140, 150 is heated. Liquid quench is applied to produce hardened zones 100, 104 in the heated zone formed directly under the inductors 140, 150. Thereafter, side housing 10 is indexed to a new position and subsequent zones 100, 104 are produced by the inductors 140, 150, respectively.

The smaller hardened zones 102, 106 are produced in a similar fashion. Inductor 160 shown in phantom lines is connected by leads 162, 164 across high frequency power source 166. In a like manner, a second inductor 170, shown in phantom lines, is connected by leads 172, 174 across high frequency power source 176. Energizing of these power sources produces heating patterns under the inductors 170, 172 which are subsequently quenched to produce the hardened zones 106, 102, respectively.

The method as described above can be used most efficiently when the zones have uniform sizes or at least only a finite number of different sizes are employed. If the hardened zones vary in size, then the number of inductors would have to be increased to produce an overall hardened pattern.

Figure 4:
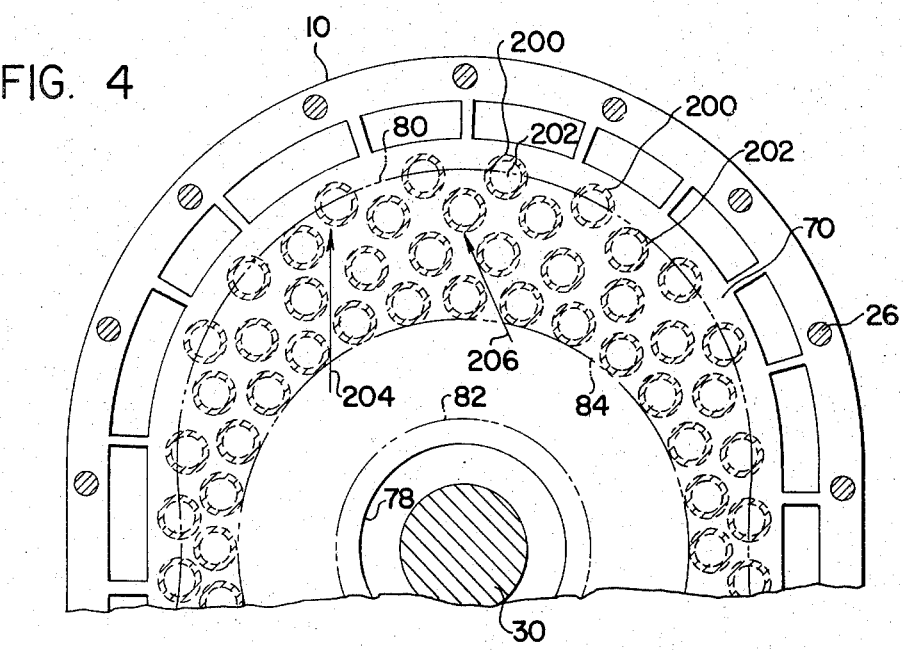
FIG. 4 is a partial view similar to FIG. 3 showing a modification of the preferred embodiment of the present invention; and, FIG. 5 is a partial view similar to FIG. 3 showing still a further modification of the preferred embodiment of the present invention.

Referring now to FIG. 4, a modification of the present invention is illustrated. In accordance with this modification, a plurality of circular zones 200 are formed on inwardly facing surface 70. These circular zones have internal diameters 202 which are generally greater than the thickness of the seals 52, 54 and 56 so that additional possible blow by paths are created as these side seals slide over the circular hardened zones. As illustrated, the hardened zones are arranged so that any straight line between locus 80 and locus 84 must intersect one of the circular hardened zones.

Figure 5:
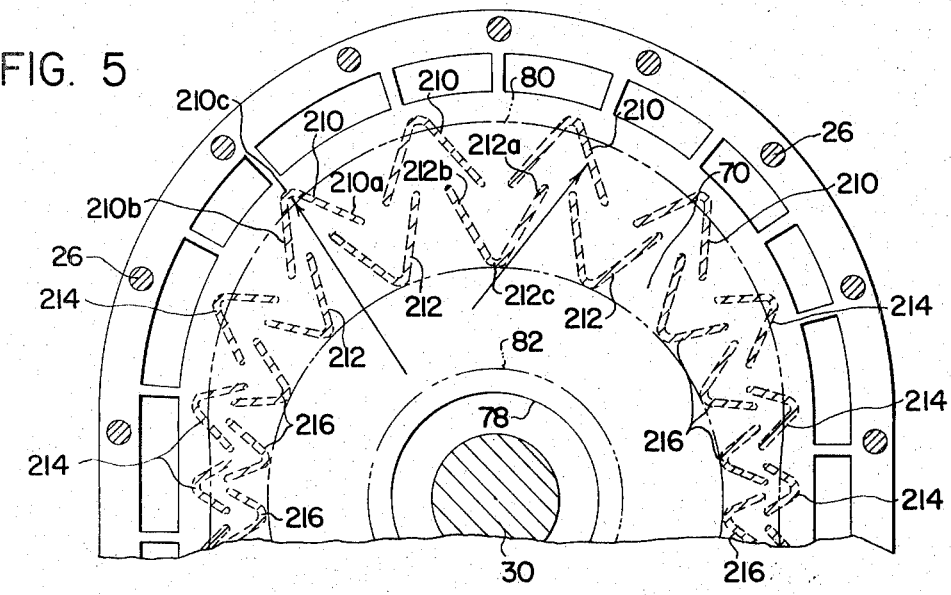

Referring now to FIG. 5, the same general concept as illustrated in FIG. 3 is employed within this particular modification of the invention. The zones are generally V-shaped instead of being arcuate as previously discussed. The larger zones 210, and 212 have spaced legs and a connecting portion identified by the subscripts a, b and c, respectively. In a like manner, the smaller hardened zones 214, 216 have spaced legs and connecting portions, which are not numbered. Otherwise, the pattern shown in FIG. 5 has the attributes and advantages of the preferred embodiment of the invention illustrated in FIG. 3.

Having thus defined our invention, we claim:

1. In a side housing for a rotary piston internal combustion engine comprising an inwardly facing surface adapted to be maintained in rubbing contact with at least an outer and an inner sealing member mounted on a rotor means of said engine, said inner sealing member contacting said surface inwardly of a generally circular path on said surface as said rotor rotates, said surface being bound by an outer periphery adjacent a peripheral mounting area and an inner periphery adjacent a central opening in said side housing, and said surface having a plurality of separate and distinct hardened zones, the improvement comprising: said hardened zones being arranged in a somewhat circular pattern having an outermost extremity and an innermost extremity, each of said zones has first and second portions spaced from each other in a direction generally circumferential of said pattern with said portions of each zone converging in a generally radial direction, said zones being generally uniformly distributed around said pattern and at least in the area of said surface bound by said mounting area and said circular path, said first and second portions of said zones nearest to said innermost periphery diverging radially outwardly and said first and second portions of said zones nearest to said outermost periphery diverging radially inwardly.

* * * * *